March 12, 1968 H. M. ARNESON 3,372,948
ROTATABLE COUPLING
Filed March 24, 1965
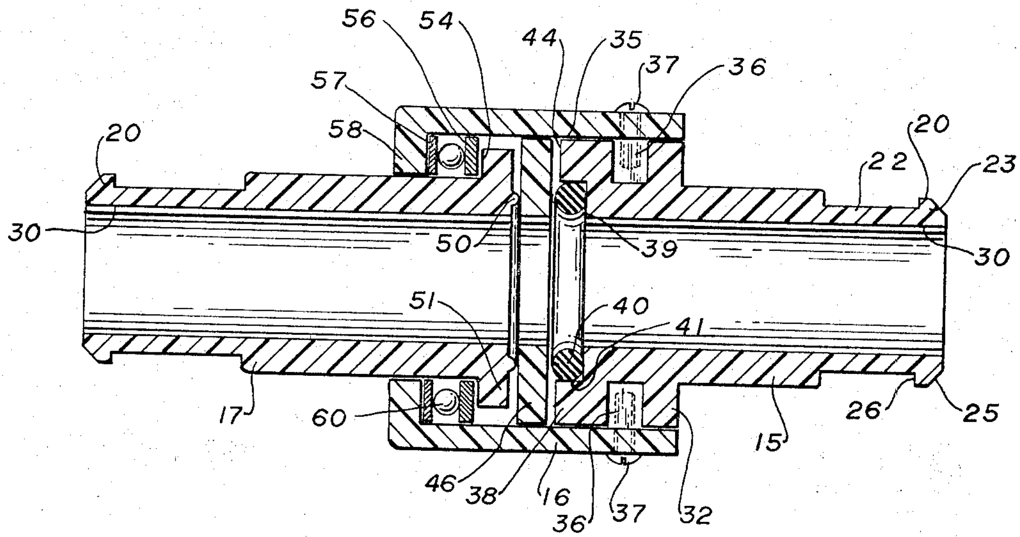
FIG. 1
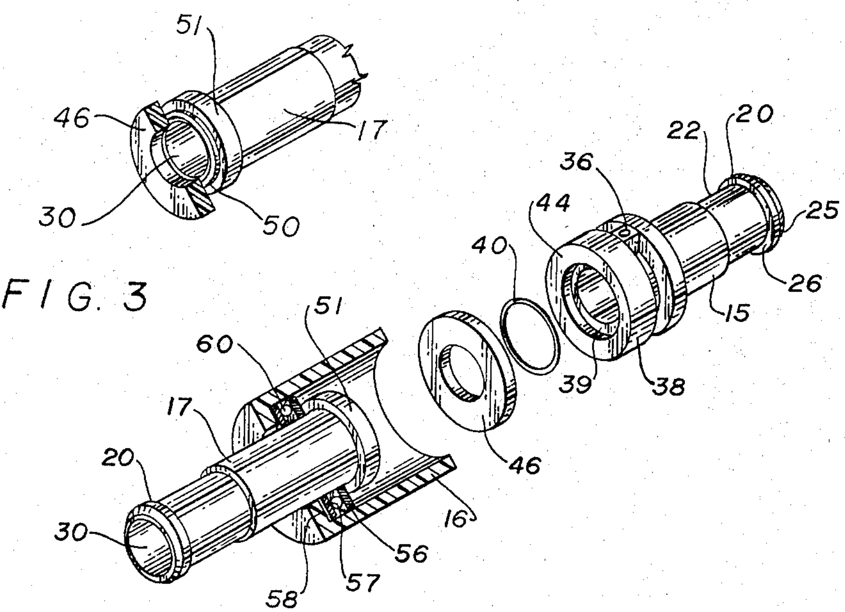
FIG. 3
FIG. 2
INVENTOR.
HOWARD M. ARNESON
BY
Townsend and Townsend
ATTORNEYS United States Patent Office 3,372,948

Patented Mar. 12, 1968

3,372,948

ROTATABLE COUPLING

Howard M. Arneson, San Rafael, Calif., assignor to Arneson Products, Inc., San Rafael, Calif., a corporation of California Filed Mar. 24, 1965, Ser. No. 442,384
1 Claim. (Cl. 285—98)

ABSTRACT OF THE DISCLOSURE

A flexible coupling for high pressure fluid transfer including a pair of axially aligned barrels in which a rigid washer and a flexible washer are interposed between the abutting ends of the two barrels to effect a water-tight rotatable seal between the two barrels in which the two barrels are restricted in nested end to end alignment by rotatable restricting means.

This invention relates to a high pressure liquid coupling for providing free rotation throughout 360°. In many applications it is necessary to provide a light-weight freely rotatable coupling for liquid carrying hose members. One particular application of concern is in conjunction with swimming pool cleaning devices, such as shown in applicant's co-pending patent application Ser. No. 427,815, filed Jan. 25, 1965, in which a swimming pool cleaning apparatus is arranged to traverse in rotating paths about the pool surface. The hose must be freely rotatable at the coupling in order to prevent entanglement. Such applications also require that the impedance against rotation be at the lowest possible level in order to maintain the desired pool cleaning traverse. Such devices also require water integrity for water pressure under relatively high pressure gradients.

It is the object of the present invention to provide a simple hose coupler which will allow free 360° rotation of the two coupled hoses while maintaining a water-tight seal between the hoses.

Another object of this invention is to provide a hose coupling in which a first section is flange-biased against ball bearings for free rotation relative to a second section, and which further incorporates the provision of frictional pressure between coupled members to provide the water-tight seal.

Another object of the present invention is to provide a coupling between the relatively rotatable parts in which a flexible rubber-like O-ring is arranged with its interior or bore surface exposed to the high pressure fluid within the coupling so arranged as to react with the fluid pressure and therein cause the flexible ring to expand into a flattened relationship thereby forcing the component parts of the coupling into water-tight seal relationship.

Other objects of the present invention will become apparent upon reading the following specifications and referring to the accompanying drawings in which similar characters of reference represent corresponding parts in each of the several views.

In describing the invention, reference will be made to the accompanying drawing in which:

FIG. 1 is a cross-sectional view of the hose coupling of this invention;

FIG. 2 is an exploded perspective view thereof; and

FIG. 3 is a partial perspective view showing the inside face of the rotating barrel of the coupling.

The coupling of the present invention comprises a fixed hose mounting barrel 15 fixedly mounted to a housing 16 which carries a rotatably mounted barrel 17 disposed in axial alignment with the fixed barrel 15. Housing 16 is arranged to maintain the two barrels 15 and 17 in water-tight abutment and in axial alignment under conditions that will allow barrel 17 to be completely freely rotatable within the housing. Both barrels 15 and 17 are provided with hose receiving flanges 20 which generally comprise an area 22 of reduced diameter having a flange 23 on the tip which forms a frictional engagement for flexible hoses. Flange 23 is bevelled at 25 to allow the hose to be more freely inserted on the flange and is flattened at the opposite side 26 in a configuration which inhibits hose removal once installed. Each of the barrels 15 and 17 is provided with bore 30 of identical diameter so that fluid communication between the two barrels is virtually unrestricted. Fixed barrel 15 is provided with a mounting flange ring 32 integrally formed of the barrel which nests in water-tight engagement with the inside wall 35 of housing 16. Screw mounting plugs are formed in the side wall of barrel 15 as at 36, in order to receive screws 37 for permanently mounting the fixed barrel 15 to the housing. The inner end 38 of fixed barrel 15 is formed with a recess 39 into which is fitted a flexible ring washer 40. Washer 40 may be made out of rubber or plastic materials having a rubber-like consistency and flexibility. Washer 40 is formed with an inside diameter which is greater than the bore diameter 30 of the two barrels. The outer diameter is commensurate with the wall 41 of the formed recess 39, so that pressure against the inside end 44 of the fixed barrel 15 will cause a flattening of washer 40 and effect a water-tight seal. A Teflon washer 46 is arranged with two flat surfaces, one arranged to abut directly against the flexible washer 40 and the other arranged for contact with a ring protuberance 50 mounted on the inside flange 51 of the rotatable barrel 17. Pressure of ring protuberance 50 against the relatively soft and solid lubricating surface of the Teflon washer 46 similarly functions as a water seal. The inside wall 54 of flange 51 of the rotatable barrel 17 is arranged to react against a ball bearing retaining ring 56. A second ball bearing retaining ring 57 is nested against an inwardly projecting flange 58 formed on the end of housing 16. Between the two bearing retaining rings 56 and 57 are disposed an array of ball bearings 60. The inside diameter of retaining rings 56 and 57 and flange 58 of housing 16 are sufficiently greater than the outside diameter of barrel 17 so that there is allowed free rotation of the barrel with respect to the aforesaid components.

In assembly, bearing retaining ring 57 is inserted in position nested against flange 58. Ball bearings 60 are disposed between rings 57 and 56. Movable barrel 17 is then inserted into the housing with its flange 54 nested in compression against retaining ring 56. The inside wall of housing 16 and the outer wall of rotatable barrel 17 form barriers to retain the bearings in their nested engagement between the two retaining rings. Teflon washer 46 is then placed within the barrel with one surface nested against the concave ridge or ring 50. Ring 50 is formed in a half circle in cross section integrally of the inward face of barrel 17 and is arranged under compression to be freely rotatable and in water-sealed relation with washer 46. Washer 46 is formed of a material having a self-lubricated surface exhibiting a low coefficient of friction and a consistency having sufficient flexibility to readily conform to slight variations which might occur in ring 50. Thus, the combination of ring 50 and the washer provides a low friction, water-tight seal under a compression relationship.

Flexible barrel 15 is then installed with a rubber or flexible washer 40. The flattening, due to the fluid pressure, causes a longitudinal displacement of the O-ring 40 which compresses Teflon washer 46 tightly against embossment 50 to create a completely water-tight seal. It can be seen that the higher the pressure within the system, the tighter will be the compression of the various parts, therefore the tightness of the parts will be directly proportional to the pressure within the system which further functions to insure the sealing relationship under varying pressure conditions.

In operation, barrel 17 is maintained in a remarkably free rotating relationship with respect to housing 16 and fixed barrel 15 due to the low coefficient of friction exerted by the ball bearings 60 and the embossment 50 against ring washer 46.

It can be seen in this structure that when hoses are fitted to the two hose fitting flanges 20 of the two barrels 15 and 17, there will be fluid communication between the two hoses that will allow full 360° low friction rotation of the two hoses relative to each other, and at the same time the coupling will afford a complete water seal to prevent leakage of the liquid passing between the two hoses at the coupling.

While one embodiment of this invention has been shown and described, it will be apparent that other adaptations and modifications can be made without departing from the true spirit and scope of the invention.

What is claimed is:

1. A hose coupling device suitable for maintaining a watertight seal between a first hose segment and a second hose segment while allowing freedom of axial rotation of the first hose segment relative to the second hose segment, comprising: first and second elongated barrels, each having one end adapted for insertion into one of said first and second hose segments and a second end defining a circumferential flange extending outwardly normal to the axis of the respective barrel, said second flanged ends being in spaced end-to-end relationship; an elongated tubular housing surrounding the flanged ends of said barrels, said housing having a first end defining a circumferential flange extending inwardly normal to the axis of said housing, the internal diameter of said inwardly extending flange being less than the diameter of the outwardly extending flange on said first barrel; bearing means disposed between the spaced flanges on said first barrel and said tubular housing and in contact therewith for absorbing axial loads; the flange of said second barrel including a radially inwardly extending peripheral groove thereabout, a plurality of rectangular blocks disposed in said groove, equiangular disposed openings extending through the wall of said housing, means disposed through said openings and into said rectangular blocks for retaining the housing assembled about said flanges and bearing means; a resilient washer having a self-lubricating surface exhibiting a low coefficient of friction, said washer being disposed within said housing between the flanged ends of said barrels and having an outer diameter substantially engaging the inner periphery of said housing; said resilient washer and barrels defining, in combination, an internal conduit of substantially uniform cross section; a circumferential protuberance extending from the flanged end of said first member intermediate the radial ends thereof; said second barrel being provided with an annular, coaxially aligned recess at the flanged end thereof opening into said conduit; and a compressible annular O-ring disposed within said recess and having a cross-sectional diameter greater than the axial depth of said recess; said O-ring having an internal opening substantially equal to the internal opening of said conduit, whereby the pressure of liquid flowing through said conduit will force said compressible O-ring to expand radially and extrude into axial contact with said washer and said second barrel to provide a watertight relationship between the flanged ends of said barrels, and said washer and O-ring while allowing rotational movement of said first barrel with respect to said housing.

References Cited

UNITED STATES PATENTS

| | | | |
|---|---|---|---|
| 2,382,375 | 8/1945 | Allen et al. | 285—98 |
| 2,390,892 | 12/1945 | McCormack | 285—279 X |
| 3,148,897 | 9/1964 | Hurt et al. | 285—404 X |

OTHER REFERENCES

| | | |
|---|---|---|
| 518,930 | 3–1940 | Great Britain. |
| 1,183,872 | 2–1959 | France. |

CARL W. TOMLIN, *Primary Examiner.*
T. F. CALLAGHAN, *Examiner.*